(12) United States Patent
Wang et al.

(10) Patent No.: US 8,064,226 B2
(45) Date of Patent: Nov. 22, 2011

(54) CONTROL CIRCUIT WITH FREQUENCY COMPENSATION

(75) Inventors: Yen-Hui Wang, Hsinchu (TW); Chia-Chieh Hung, Lujhu Township, Taoyuan County (TW)

(73) Assignee: Grenergy Opto, Inc., Hsinchu Science Park, Hsinchu (TW)

( * ) Notice: Subject to any disclaimer, the term of this patent is extended or adjusted under 35 U.S.C. 154(b) by 450 days.

(21) Appl. No.: 12/433,296

(22) Filed: Apr. 30, 2009

(65) Prior Publication Data

US 2010/0277144 A1   Nov. 4, 2010

(51) Int. Cl.
*H02M 3/335* (2006.01)
(52) U.S. Cl. .......................... 363/16; 323/282
(58) Field of Classification Search .......... 323/282–290, 323/234, 280, 268, 211; 363/16–20, 21.07, 363/21.11, 21.17, 127, 97; 327/536, 541, 327/560; 315/224, 291, 307
See application file for complete search history.

(56) References Cited

U.S. PATENT DOCUMENTS

| | | | | | |
|---|---|---|---|---|---|
| 4,214,307 | A | * | 7/1980 | Peterson et al. | 701/110 |
| 5,177,018 | A | * | 1/1993 | Inoue et al. | 435/253.5 |
| 5,579,329 | A | * | 11/1996 | Taguchi | 372/38.01 |
| 5,600,234 | A | * | 2/1997 | Hastings et al. | 323/282 |
| 6,246,221 | B1 | * | 6/2001 | Xi | 323/280 |
| 7,301,400 | B1 | * | 11/2007 | Dening | 330/276 |
| 7,468,896 | B2 | * | 12/2008 | Gong et al. | 363/21.17 |

* cited by examiner

*Primary Examiner* — Rajnikant Patel
(74) *Attorney, Agent, or Firm* — Winston Hsu; Scott Margo

(57) ABSTRACT

The present invention discloses a control circuit with frequency compensation, which can be applied to an open-loop control system. The control circuit includes an oscillator which is additionally connected to a first comparator including a first input end, a second input end and a first output end. The first input end provides for inputting a sampling current, the second input end provides for inputting a total voltage of a reference voltage and a DC-level voltage, and the first output end outputs a down-conversion signal. When the sampling current is larger than the total voltage, the first comparator will generate the down-conversion signal to the oscillator to reduce a frequency of the oscillator, such that a current of the open-loop control system can be controlled effectively to prevent an electronic element form being burned down.

3 Claims, 4 Drawing Sheets

CONTROL CIRCUIT WITH FREQUENCY COMPENSATION

BACKGROUND OF THE INVENTION a) Field of the Invention

The present invention relates to a control circuit which is applied to an open-loop control system and more particularly to a control circuit with frequency compensation, which can automatically perform frequency down-conversion when a turn-on time required by the control system is less than the minimum turn-on time.

b) Description of the Prior Art

As a light emitting diode is provided with advantages of having a high illumination efficiency, a long service time, not being damaged easily, consuming less electricity, being environmental friendly and having a small volume, it has been one of the most important light sources in recent years. In early years, as the light emitting diode does not have sufficient luminance, it was often used in an indicating lamp or a display panel. However, due to recent breakthrough in material science and technology, the luminance of the light emitting diode has already been improved significantly, especially that as a white-light light emitting diode emerges, existing conventional illuminating equipment has been gradually replaced by the light emitting diode.

On the other hand, as more and more applications of the light emitting diodes, a driving circuit to drive the light emitting diodes is becoming very important. The driving circuit can properly provide a stable power source to the light emitting diodes, allowing the light emitting diodes to illuminate stably. Whereas in order to reduce a cost and circuit space, many vendors will integrate the illumination driving circuit into an integrated circuit (IC) that by only using the illumination driving IC, the light emitting diodes can be effectively driven to illuminate.

However, when using the aforementioned illumination driving circuit, following issues and shortcomings actually exist to be improved.

None of the illumination driving circuit on a market can be applied to a condition of heavy line and light load, because at this time, a turn-on time required by the circuit is usually less than the minimum turn-on time; therefore, it results in that a current which passes through an illumination element, such as a light emitting diode, is too large that the light emitting diode will be burned down.

SUMMARY OF THE INVENTION

The primary object of the present invention is to provide a control circuit which can automatically perform frequency down-conversion according to a requirement of a control system.

To achieve the aforementioned object, the control circuit of the present invention includes an oscillator, a first comparator, a second comparator and a flip-flop, wherein the oscillator can periodically generate a set signal; the first comparator includes a first input end for inputting a sampling current, a second input end for inputting a total voltage of a reference voltage and a DC (Direct Current)-level voltage, and a first output end which generates a down-conversion signal to the oscillator when the sampling current is larger than the total voltage depending on comparison of the first input end with the second input end, so as to reduce a frequency at which the oscillator generates the set signal; the second comparator includes a third input end for inputting the sampling current, a fourth input end for inputting the reference voltage, and a second output end which generates a reset signal for output when the sampling current is larger than the reference voltage depending on comparison of the third input end with the fourth input end; and the flip-flop includes a set end, a reset end and an output end, with the set end receiving the set signal generated by the oscillator, the reset end receiving the reset signal generated by the second output end, and the output end conducting a switch between a high-level voltage and a low-level voltage depending on the set signal and the reset signal.

Accordingly, when the sampling current of the first comparator is larger than the total voltage of the reference voltage and the DC-level voltage, which means that when the turn-on time required by the control system is less than the minimum turn-on time, the first comparator will output the down-conversion signal to reduce the frequency of the oscillator, so as to comply with the frequency required by the control circuit, thereby further preventing from a risk of burn-down due to a too large a load current of the control system.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
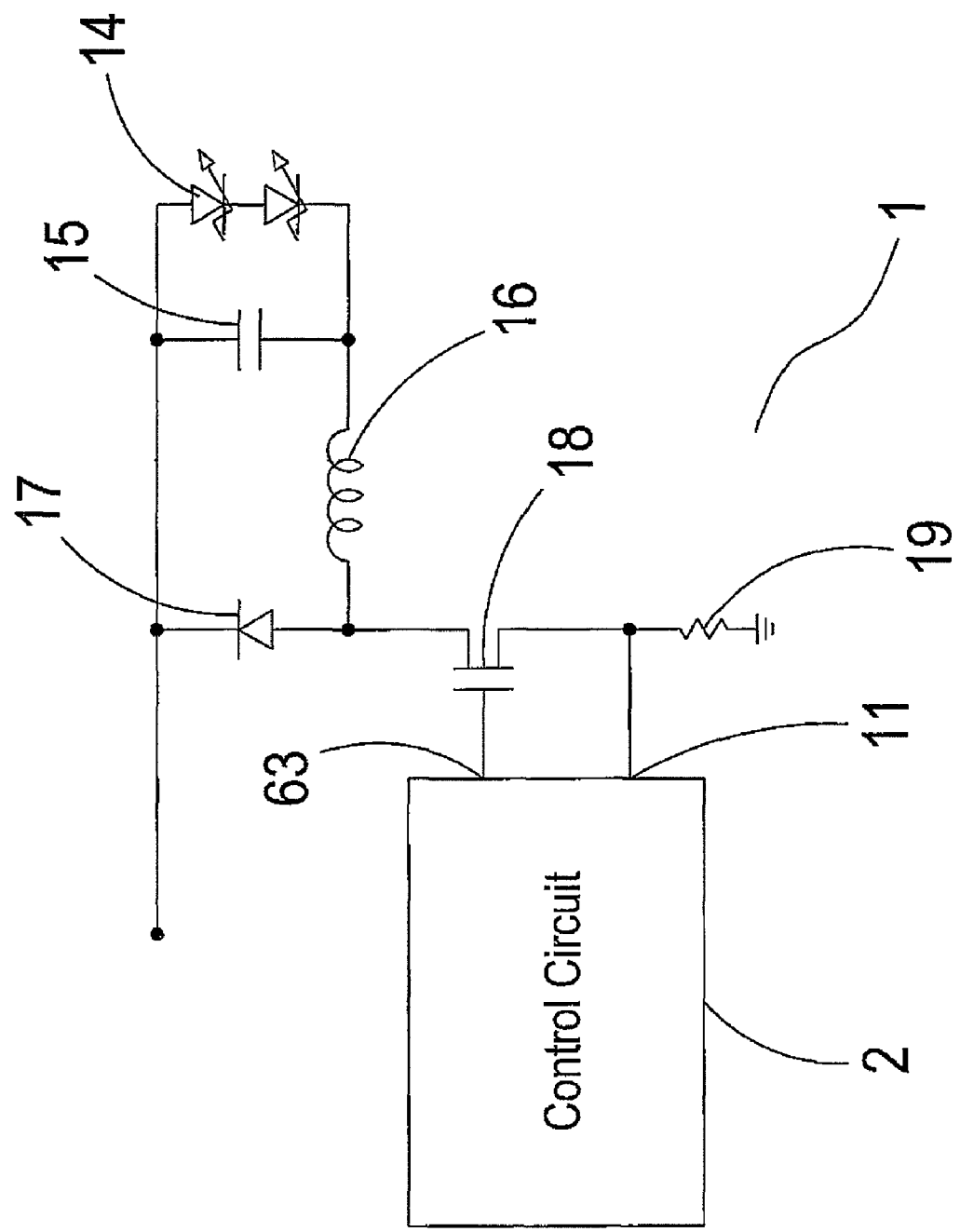
FIG. 1 shows a first schematic view of an implementation of a preferred embodiment of the present invention.
Figure 2:
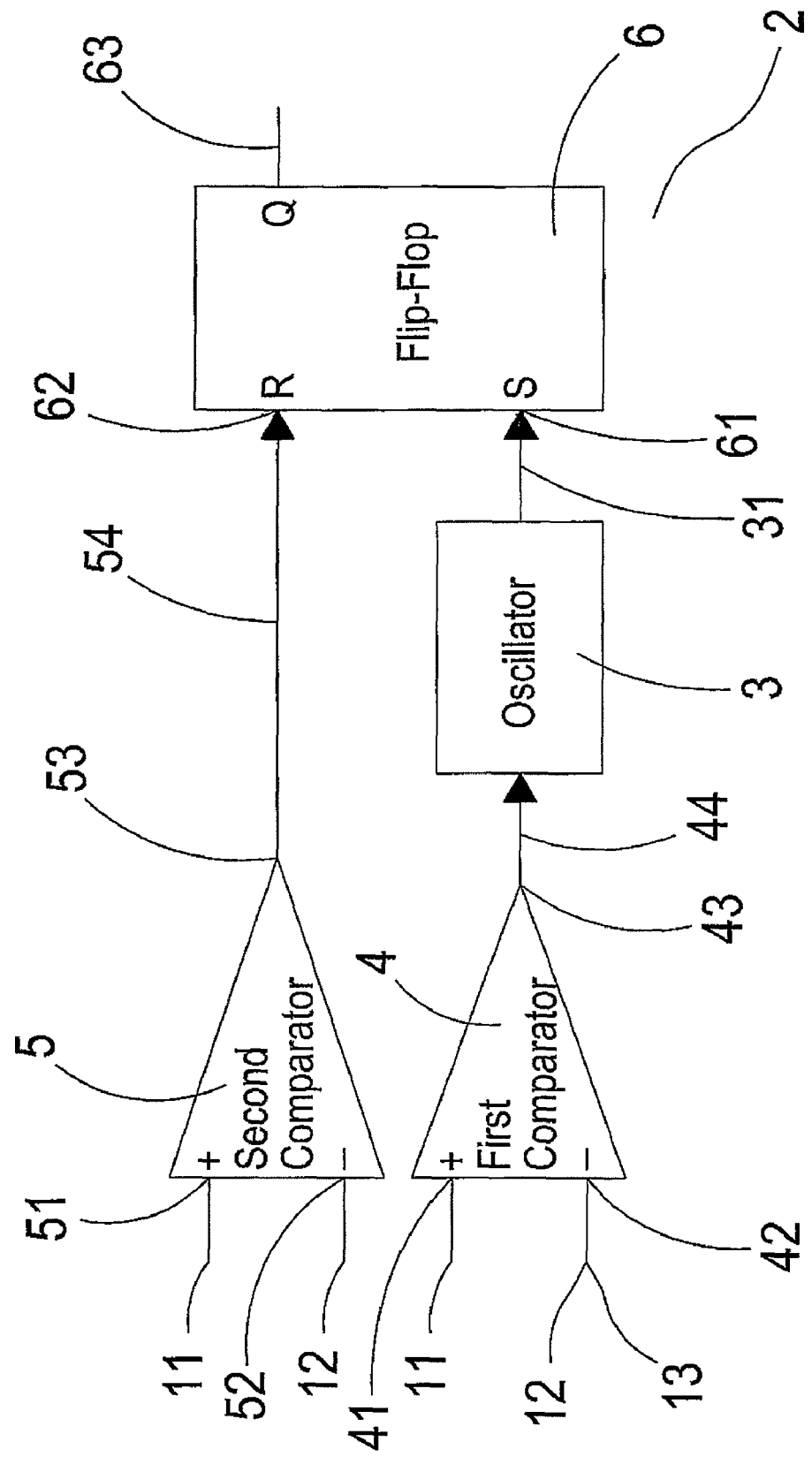
FIG. 2 shows a second schematic view of an implementation of a preferred embodiment of the present invention.
Figure 3:
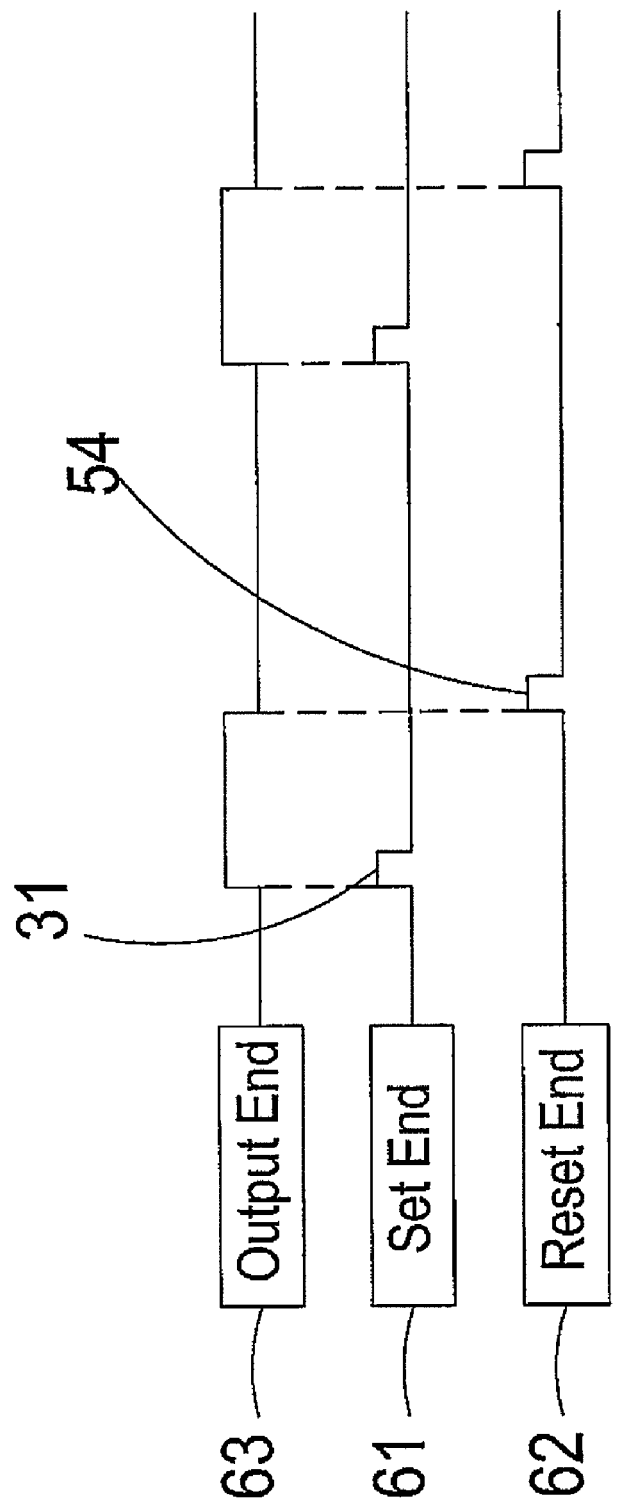
FIG. 3 shows a first schematic view of an operation of a preferred embodiment of the present invention.

Referring to FIG. 1 and FIG. 2, it shows a first schematic view and a second schematic view of an implementation of a preferred embodiment of the present invention. As shown in the drawings, the present invention can be applied to an illumination driving circuit 1 which includes light emitting diodes 14, a capacitor 15, an inductor 16, a diode 17, a power transistor 18 and a resistor 19, wherein the power transistor 18 is used as a switch in the present circuit, and two ends of the power transistor 18, which are an output end 63 and an end for taking a sampling current 11 respectively, are connected to a control circuit 2. The control circuit 2 (as shown in FIG. 2) comprises an oscillator 3 which can periodically generate a set signal 31; a first comparator 4 which generates a down-conversion signal 44 to reduce a frequency of the oscillator 3, and includes a first input end 41 for inputting the sampling current 11, a second input end 42 for inputting a total voltage of a reference voltage 12 and a DC-level voltage 13, with the reference voltage 12 being generated in the control circuit 2 and the DC-level voltage 13 being between 0.1v (volt) to 10v and usually 0.25v, depending on material properties, and a first output end 43 generating the down-conversion signal 44 to the oscillator 3 when the sampling current 11 is larger than the total voltage depending on comparison of the first input end 41 with the second input end 42, so as to reduce a frequency at which the oscillator 3 generates the set signal 31; a second comparator 5 which includes a third input end 51 for inputting the sampling current 11, a fourth input end 52 for inputting the reference voltage 12, and a second output end 53 generating a reset signal 54 for output when the sampling current 11 is larger than the reference voltage 12 depending on comparison of the third input end 51 with the fourth input end 52; and a flip-flop 6 which can be an RS (Reset-Set) flip-flop 6 including a set end 61, a reset end 62 and an output end 63, with the set end 61 receiving the set signal 31 generated by the oscillator 3, the reset end 62 receiving the reset signal 54 generated by the second output end 53, and the output end 63 conducting a switch between a high-level voltage and a low-level voltage depending on the set signal 31 and the reset signal 54.

Referring to FIGS. 1 to 4, it shows a first schematic view and a second schematic view of an implementation, as well as a first schematic view and a second schematic view of an operation, of a preferred embodiment of the present invention. As shown in the drawings, when the control circuit 2 of the present invention is applied to the illumination driving circuit 1 and operates, as the inductor 16 will be charged first, the illumination driving circuit 1 will be provided with inductance, which further turns on the power transistor 18 that is used as a switch. Whereas, the oscillator 3 will periodically generates the set signal 31 to the set end 61 of the flip-flop 6, such that the output end 63 of the flip-flop 6 is switched to output the high-level voltage.

On the other hand, as the power transistor 18 is turned on, the sampling current 11 will rise slowly as the inductor 16 has been charged. When the sampling current 11 is larger than the reference voltage 12, the second comparator 5 will generate the reset signal 54 for output; therefore, the flip-flop 6 is switched to output the low-level voltage.

Furthermore, when the sampling current 11 rises further and is larger than the total voltage of the reference voltage 12 and the DC-level voltage 13, at this time, the turn-on time required by the illumination driving circuit 1 is less than the minimum turn-on time, the first comparator 4 will output the down-conversion signal 44 to the oscillator 3 to generate the frequency of the set signal 31, allowing the turn-on time required by the illumination driving circuit 1 to be greater than the minimum turn-on time. By the control circuit 2 of the present invention, the illumination driving circuit 1 can be equally applied to a condition of heavy line and light load, preventing an illumination element, such as the light emitting diode 14, to be burned down due to a too large a current which passes through the element, further increasing an application range of the illumination driving circuit 1 and also serving as a protection mechanism in an extreme system condition.

Figure 4:
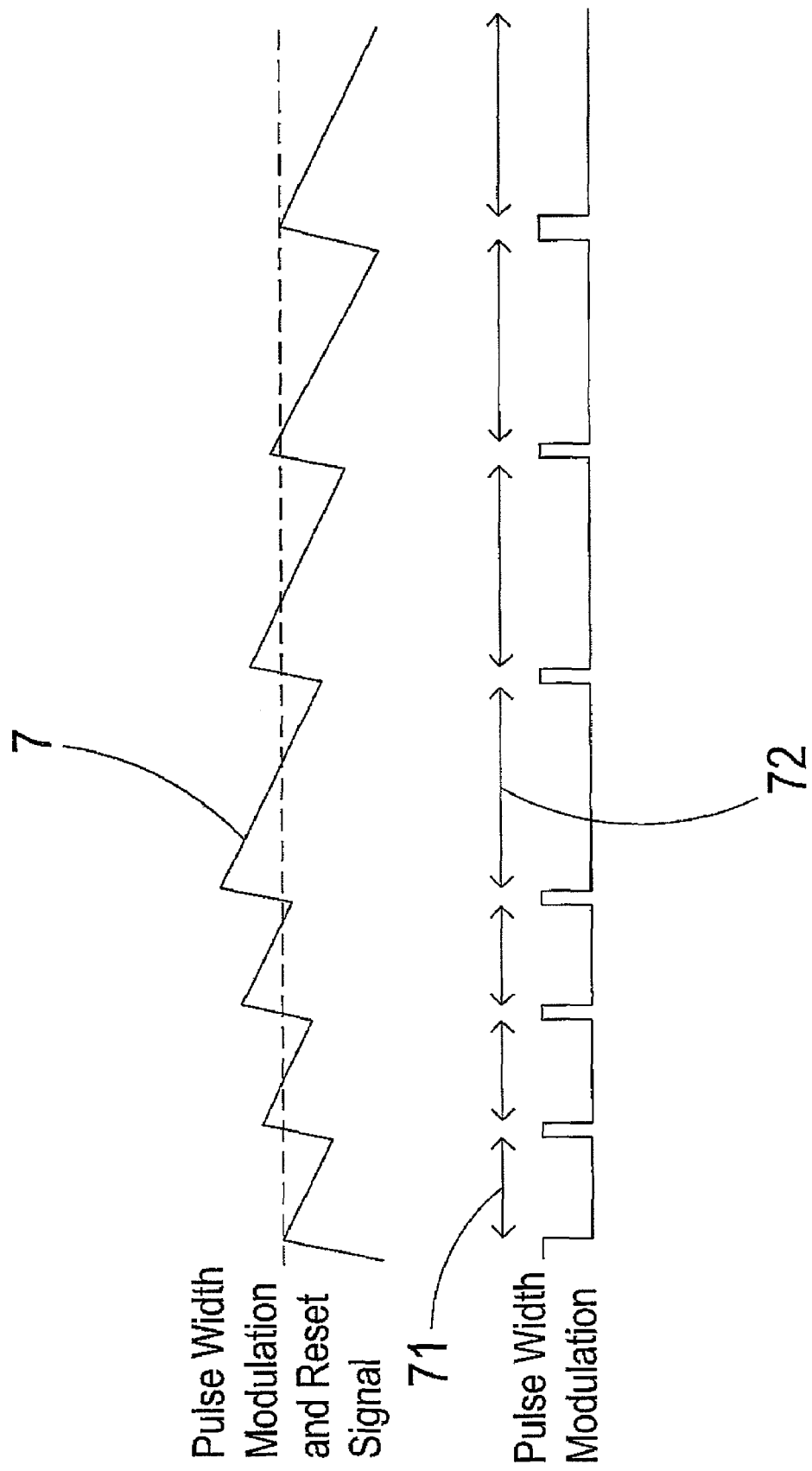
FIG. 4 shows a second schematic view of an operation of a preferred embodiment of the present invention.

In addition, as shown in FIG. 4, as the turn-on time required by the control system is less than the minimum turn-on time, a load current 7 will increase continuously. If this condition keeps on occurring, the load current 7 will be too large that a load will be burned down. Whereas, in the present invention, as the first comparator 4 will generate the down-conversion signal 44 to the oscillator 3 to reduce the frequency at which the oscillator 3 generates the set signal 31 (refer to FIG. 2), which further allows an original period 71 of the control system to slow down to an adjusted period 71, thereby achieving the practical progressiveness of automatic frequency compensation.

Accordingly, the key technologies that the control circuit with the frequency compensation, in accordance with the present invention, is able to improve the prior art, are that the oscillator 3 of the present invention is additionally connected to the first comparator 4, such that when the sampling current 11 of the illumination driving circuit 1 increases and is larger than the total voltage of the reference voltage 12 and the DC-level voltage 13, at this time, the turn-on time required by the illumination driving circuit 1 is less than the minimum turn-on time, the first comparator 4 will generate the down-conversion signal 44 to the oscillator 3 to generate the frequency of the set signal 31, allowing the turn-on time required by the illumination driving circuit 1 to be greater than the minimum turn-on time.

By the control circuit 2 of the present invention, the illumination driving circuit 1 can be equally applied to the condition of heavy line and light load, preventing the light emitting diodes 14 from being burned down due to a too large the current.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A control circuit with frequency compensation, which is applied to an open-loop control system, comprising an oscillator which periodically generates a set signal; a first comparator which includes a first input end for inputting a sampling current, a second input end for inputting a total voltage of a reference voltage and a DC (Direct Current)-level voltage; a first output end generating a down-conversion signal to the oscillator when the sampling current is larger than the total voltage depending on comparison of the first input end with the second input end, so as to reduce a frequency at which the oscillator generates the set signal; a second comparator which includes a third input end for inputting the sampling current, a fourth input end for inputting the reference voltage, and a second output end generating a reset signal for output when the sampling current is larger than the reference voltage depending on comparison of the third input end with the fourth input end; and a flip-flop which includes a set end, a reset end and an output end, with the set end receiving the set signal generated by the oscillator, the reset end receiving the reset signal generated by the second output end, and the output end conducting a switch between a high-level voltage and a low-level voltage depending on the set signal and the reset signal.

2. The control circuit with frequency compensation, according to claim 1, wherein the DC-level voltage is between 0.1v (volt) to 10v.

3. The control circuit with frequency compensation, according to claim 1, wherein the flip-flop is an RS (Reset-Set) flip-flop.

* * * * *